(12) United States Patent
Harcourt et al.

(10) Patent No.: US 7,243,975 B2
(45) Date of Patent: Jul. 17, 2007

(54) PROTECTIVE COVER

(76) Inventors: John A. Harcourt, 12016 Thornridge Rd., Oklahoma City, OK (US) 73120; Susan G. Cody, 2617 Country Club Dr. West, Oklahoma City, OK (US) 73116

( * ) Notice: Subject to any disclaimer, the term of this patent is extended or adjusted under 35 U.S.C. 154(b) by 170 days.

(21) Appl. No.: 11/189,644

(22) Filed: Jul. 26, 2005

(65) Prior Publication Data

US 2006/0043761 A1    Mar. 2, 2006

Related U.S. Application Data

(60) Provisional application No. 60/591,117, filed on Jul. 26, 2004.

(51) Int. Cl.
*B60J 11/00* (2006.01)

(52) U.S. Cl. .................. 296/136.02; 296/136.01; 296/136.07

(58) Field of Classification Search ............ 296/136.01, 296/136.02, 136.07, 136.1, 136.13; 150/166, 150/167; 135/88.05
See application file for complete search history.

(56) References Cited

U.S. PATENT DOCUMENTS

| | | | |
|---|---|---|---|
| 4,261,776 A | 4/1981 | Lea et al. | |
| 4,432,581 A | 2/1984 | Guma | |
| 4,720,135 A | 1/1988 | Farina | |
| 4,807,922 A | 2/1989 | Glover | |
| 4,951,993 A | 8/1990 | Taboada | |
| 5,040,557 A | 8/1991 | Morgan | |
| 5,242,206 A | 9/1993 | Heck | |
| 5,255,875 A | 10/1993 | Maglieri | |
| 5,287,904 A | 2/1994 | Smith et al. | |
| 5,401,074 A | 3/1995 | Timerman | |
| 5,516,181 A | 5/1996 | Thompson | |
| 5,597,005 A | 1/1997 | Thomas | |
| D377,928 S | 2/1997 | Tillery | |
| 5,675,855 A | 10/1997 | Culp | |
| 5,738,403 A | 4/1998 | Tyson | |
| 5,800,006 A | 9/1998 | Pettigrew | |
| 5,890,525 A * | 4/1999 | Shores | 150/166 |
| 5,941,594 A | 8/1999 | O'Neill | |
| 6,029,404 A | 2/2000 | Lewis | |
| 6,044,881 A * | 4/2000 | Welch et al. | 150/166 |
| 6,056,347 A * | 5/2000 | D'Adamo | 296/136.02 |
| 6,070,629 A * | 6/2000 | Whiteside | 150/166 |
| 6,113,142 A | 9/2000 | Tolbert | |
| 6,220,648 B1 | 4/2001 | Daniel | |
| 6,241,303 B1 | 6/2001 | Yee | |
| RE37,498 E | 1/2002 | Thomas | |
| 6,415,832 B1 | 7/2002 | Ricks | |
| 6,439,644 B1 | 8/2002 | Jester | |
| 6,513,858 B1 | 2/2003 | Li et al. | |

* cited by examiner

*Primary Examiner*—Lori L. Lyjak
(74) *Attorney, Agent, or Firm*—Dunlap Codding & Rogers

(57) ABSTRACT

The present invention is directed to a protective cover having a first panel superimposed over and connected to a second panel. The first panel is connected to the second panel such that the first panel is slidably moveable relative to the second panel so that the first panel will be sheared relative to the second panel upon the first panel being impacted by a force having a component which is non-perpendicular to the first panel. Each of the first panel and the second panel has a top sheet and a bottom sheet. The top sheet is connected to the bottom sheet to form an air chamber. A valve is disposed through the panels and manually operable between an open condition and a closed condition to allow air to be selectively removed from and drawn into the air chamber of the first panel. The air chamber is provided with a resilient, open-celled, foam panel to cause air to be drawn into the air chamber upon expansion of the foam panel from a collapsed condition.

16 Claims, 3 Drawing Sheets

PROTECTIVE COVER

CROSS REFERENCE TO RELATED APPLICATIONS

This application claims benefit of U.S. Provisional Application No. 60/591,117, filed Jul. 26, 2004, which is incorporated herein by reference in its entirety.

BACKGROUND OF THE INVENTION

1. Field of the Invention

The present invention relates generally to a protective cover for protecting vehicles or structures from foreign objects, and more particularly, but not by way of limitation, to a self-inflating protective cover for protecting vehicles or structures from hail.

2. Brief Description of the Related Art

Protective covers for protecting vehicles from weather, such as hail, are well known in the art. Many existing protective covers require inflation to form pneumatic cushions and therefore cannot be quickly installed should emergency conditions arise. Further, many existing covers are not sufficiently durable to resist and protect a vehicle or other structure from damaging foreign objects, such as hail. That is, these covers do not provide sufficient thickness or force-absorbing properties to resist and withstand the impact of damaging foreign objects, such as hail. Also, many existing covers are bulky and awkward making them inconvenient to store.

To this end, a protective cover is needed that is easily stored, self-inflating so as to be quickly installed during emergency situations and provides the requisite thickness necessary to resist the force of impacting foreign objects, such as hail.

DETAILED DESCRIPTION OF THE INVENTION

Figure 1:
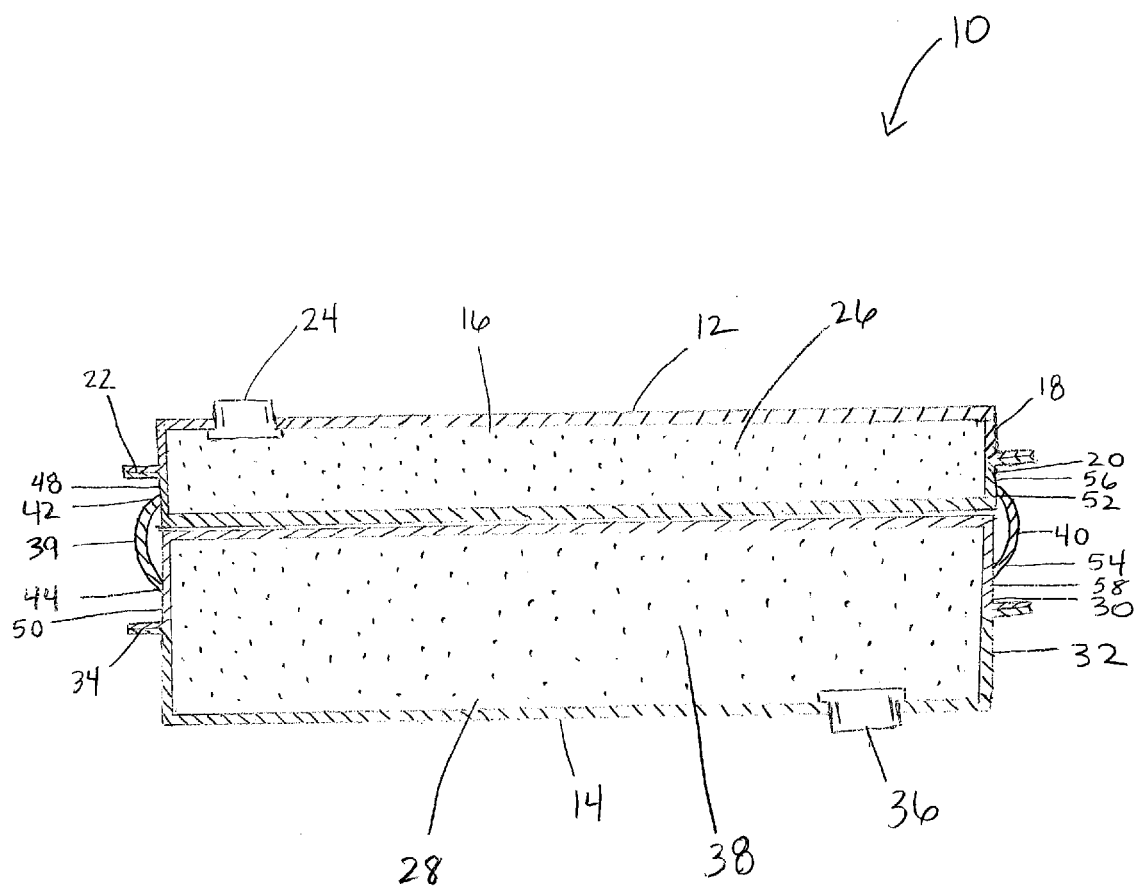
FIG. 1 is a cross-sectional view of a self-inflating protective cover constructed in accordance with the present invention.

Referring now to FIG. 1, a cross sectional view of a self-inflating protective cover 10 constructed in accordance with the present invention is shown. The self-inflating protective cover 10 includes a first panel 12 and a second panel 14. The first panel 12 includes an air chamber 16 defined by a top sheet 18 and a bottom sheet 20 joined about the periphery of the top sheet 18 and the bottom sheet 20 to form a seam 22. The top sheet 18 includes there through a valve 24 operable by manual rotation thereof between an open condition and a closed condition. The valve 24 may take a variety of forms, its function being to selectively allow passage of air into or out of the air chamber 16. Thus, air may be selectively removed from and drawn into the air chamber 16 by use of the valve 24.

A collapsible, resilient, open celled foam panel 26 rests within the air chamber 16. The function of the foam panel 26 is to aid in the inflation of the chamber 16, and also provide additional support in use of the first panel 12. More particularly, the foam panel 26 can be collapsed by pressing thereon to cause escape of air from the interior of the foam panel 26. The foam panel 26, due to its resiliency, expands upon release of such pressure and draws air into its interior. By placing such a foam panel within the air chamber 16, the first panel 12 is self-inflating, i.e., drawing air into the air chamber 16 upon its expansion from a collapsed state.

The second panel 14 includes an air chamber 28 defined by a top sheet 30 and a bottom sheet 32 joined about the periphery of the top sheet 30 and bottom sheet 32 to form a seam 34. The bottom sheet 32 includes there through a valve 36 operable by manual rotation thereof between an open condition and a closed condition. The valve 36 may take a variety of forms, its function being to selectively allow passage of air into or out of the air chamber 28. Thus, air may be selectively removed from and drawn into the air chamber 28 by use of the valve 36.

A collapsible, resilient, open celled foam panel 38 rests within the air chamber 28. The function of the foam panel 38 is to aid in the inflation of the chamber 28, and also provide additional support in use of the second panel 14. More particularly, the foam panel 38 can be collapsed by pressing thereon to cause escape of air from the interior of the foam panel 38. The foam panel 38, due to its resiliency, expands upon release of such pressure and draws air into its interior. By placing such a foam panel within the air chamber 28, the second panel 14 is self-inflating, i.e., drawing air into the air chamber 28 upon its expansion from a collapsed state.

The first panel 12 is superimposed on and connected to the second panel 14 such that the first panel 12 is slidably movable relative to the second panel 14 whereby the first panel 12 may be caused to slide relative to the second panel 14 upon the first panel 12 being impacted by an object, such as a hail stone. More specifically, thunderstorms that produce large, damaging hail also have a tendency to produce strong winds which can cause falling hail stones to impact objects at an angle. As such, the impact force has a vertical component as well as a horizontal component. The horizontal component of the impact force, which is angled or non-perpendicular relative to the first panel 12, will act to shear the first panel 12 relative to the second panel 14 and thereby cause at least a portion of the impact energy to be dissipated. In one embodiment, the first panel 12 and the second panel 14 are connected to one another by a plurality of spaced apart straps, such as first strap 39 and a second strap 40. However, the first panel 12 may be connected to the second panel 14 with a single strap that encloses the space between the first panel 12 and the second panel 14.

The first strap 39 has a first end 42 and a second end 44. The first end 42 is secured to a first side 48 of the first panel 12. The second end 44 is secured to a first side 50 of the second panel 14 as shown in FIG. 1. The second strap 40 has a first end 52 and a second end 54. The first end 52 is secured to a second side 56 of the first panel 12. The second end 54 is secured to a second side 58 of the second panel 14 as shown in FIG. 1. Each of the straps 39 and 40 are provided with a length that permits shearing movement of the first panel 12 relative to the second panel 14. It should be understood that any number of straps may be secured about the periphery of the first panel 12 and the second panel 14 of the cover 10 so long as the first panel 12 and second panel 14 are slidably movable relative to one another.

Figure 2:
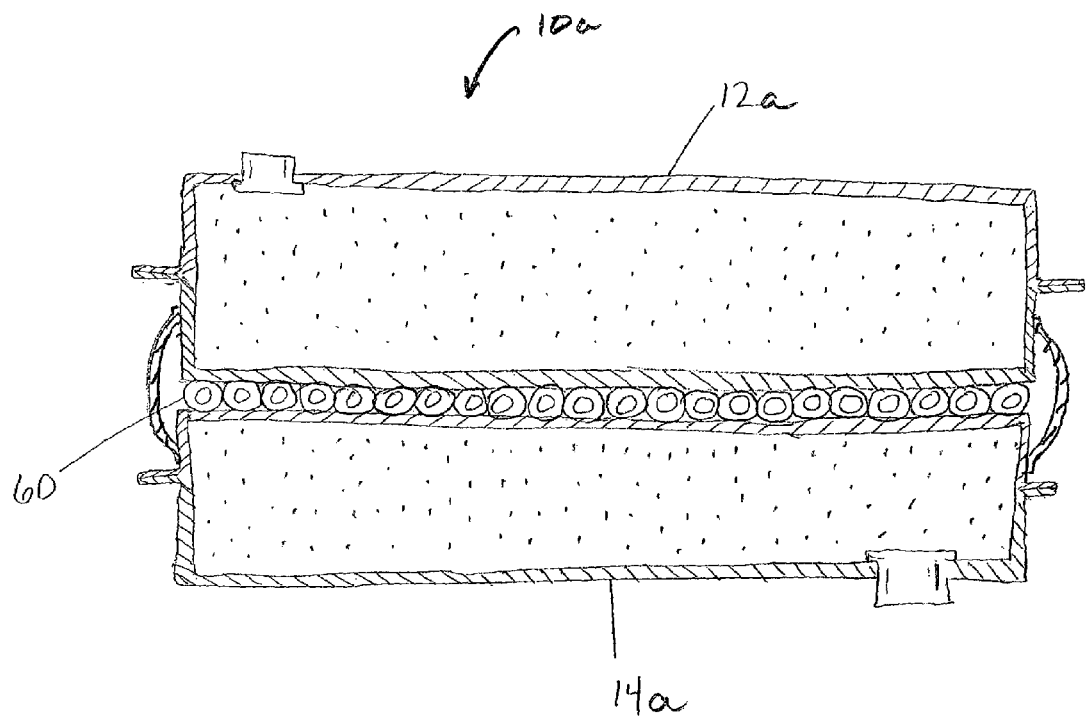
FIG. 2 is a cross-sectional view of another embodiment of a self-inflating protective cover constructed in accordance with the present invention.

FIG. 2 shows another embodiment of a self-inflating protective cover 10a. The cover 10a is similar to the cover 10 except the cover 10a has a force-absorbent material 60 placed between a first panel 12a and a second panel 14a. In one embodiment, the material 60 is a mat of hollow bamboo stems. Bamboo stems have been found to have desirable force-absorbent properties due to their tendency to collapse and shatter upon being impacted by a lateral force. Such reaction causes the bamboo stems to absorb a portion of the impact energy.

Figure 3:
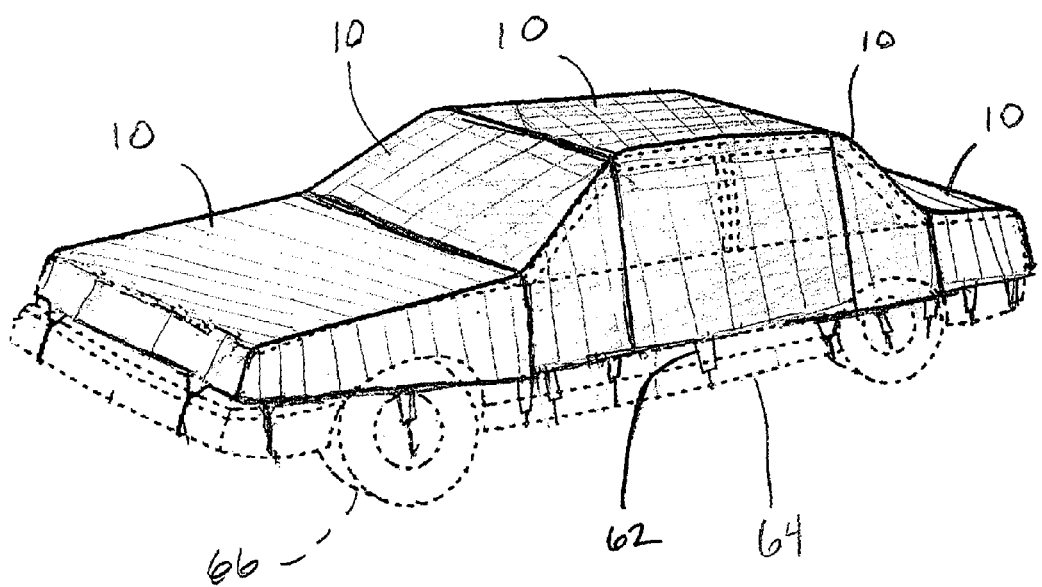
FIG. 3 is a perspective view of a vehicle shown covered by a plurality of self-inflating covers of FIG. 1.

As shown in FIG. 3, the protective 10 is provided with a plurality of straps 62 along the periphery of the second panel 14 for securing the cover 10 to a frame 64 of a vehicle 66. The straps 62 are preferably attached along each side of the second panel 14 and are designed to engage the frame 64 of the vehicle 66 without restricting movement of the first panel 12 relative to the second panel 14. The straps 62 are secured in place by a hook or other connecting members. When each of the straps 62 is engaged, the self-inflating protective cover 10 is secured upon the upper surface of the vehicle 66. While the system of straps has been described with some particularity, it is to be understood that a variety of elastic cord members may be used to secure the self-inflating protective cover 10 in place on the vehicle 66.

As shown in FIGS. 1–3, the self-inflating protective cover 10 is rectangular in shape. However, the cover 10 may be any desired shape. Further, the first panel 12 and the second panel 14 of the cover 10 may be the same shape or may be different shapes. The top sheet 18 and the bottom sheet 20 of the first panel 12 and the top sheet 30 and the bottom sheet 32 of the second panel 14 are preferably constructed of a durable, flexible, waterproof material. For example, a polyester material, including a spun PVC and/or polyurethane coating on the inner surface of each top sheet 18 and 30 and bottom sheet 20 and 32 may be used. The foam panels 26 of the first panel 12 and second panel 14 are preferably an open cell foam material of various chemical compositions.

The self-inflating protective cover 10 may be any thickness desired. For example, as shown in FIG. 1, the first panel 12 may be approximately one inch thick, while the second panel 14 may be approximately 3 inches thick. In the cover 10a shown in FIG. 2 which includes the force absorbing material 60 interposed between the first panel 12a and the second panel 14a, each of the first panel 12a and the second panel 14a may be approximately one inch thick. It is to be understood, however, that each panel may be any thickness desired and that the thickness may or may not be uniform throughout each panel.

With reference to FIG. 3, a plurality of self-inflating protective covers 10 or 10a may be used to substantially cover and protect the entire upper and side surfaces of a structure, such as a vehicle 66. For example, one protective cover 10 may be used to cover the hood and front fender area of the vehicle 66, another protective cover 10 to cover the windshield, another protective cover 10 to cover the roof and side panels of the vehicle 66, another protective cover 10 to cover the rear window, and another protective cover 10 to cover the trunk and rear fender areas of the vehicle 66 simultaneously, as shown in FIG. 3. Each of the protective covers 10 may be shaped for a specific portion of the vehicle 66 or each protective cover 10 may be constructed to have the same dimensions.

In positioning the protective covers 10 on the vehicle 66, the edge of one protective cover 10 is preferably positioned to overlap the adjacent edge of the adjacent protective cover 10 or positioned so that adjacent edges are maintained in an abutting relation. To this end, each of the protective covers 10 may be provided with connecting members such as snaps or hook and loop connecting members (not shown) to secure one protective cover 10 to an adjacent protective cover 10.

It is to also be understood that a single self-inflating protective cover of the present invention covering substantially the entire vehicle may be used.

To facilitate inflation and deflation of the protective covers 10, an electrical pump (not shown) that allows for air to be pumped into the air chambers or withdrawn therefrom may be utilized. In one embodiment, each of the first panel 12 and the second panel 14 would include multiple valves to permit the air chamber 16 of one first panel 12 to be connected to the air chamber 16 of an adjacent first panel 12 and/or the air chamber 28 of the second panel 14 to be connected to the air chamber 28 of the adjacent second panel 14 in series so that a single pump may be utilized to inflate and deflate each of the protective covers 10. The air chambers 16 of the first panel 12 may be connected to the air chamber 28 of the second panel 14. The valves may be connected together with a tube adapted to connect to valves of adjacent protective covers 10 and/or to valves of the first panel 12 and the second panel 14.

It should be understood that the self-inflating protective cover 10 described herein is not intended to be limited in use to protecting vehicles from impact forces caused by hail stones. The self-inflating protective cover 10 may also be used to protect other structures, such as roofs, furniture, equipment, and the like, from impact forces. It should also be understood that the self-inflating protective cover 10 is not intended to be limited to outdoor use. That is, the self-inflating protective cover 10 may also be used to cover structures located indoors.

After being used, the self-inflating protective cover 10 may be quickly and easily deflated and rolled into a compact cylinder shape which can be conveniently stored.

From the above description, it is clear that the present invention is well adapted to carry out the objects and to attain the advantages mentioned herein, as well as those inherent in the invention. While a presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A protective cover, comprising:
    a first panel having a top sheet and a bottom sheet, the top sheet connected to the bottom sheet to form an air chamber;
    a first valve disposed through the top sheet and manually operable between an open condition and a closed condition to allow air to be selectively removed from and drawn into the air chamber of the first panel;
    a first resilient, open-celled, foam panel disposed in the air chamber of the first panel to cause air to be drawn into the air chamber of the first panel upon expansion of the foam panel from a collapsed condition;
    a second panel having a top sheet and a bottom sheet, the top sheet of the second panel connected to the bottom sheet to form an air chamber;
    a second valve disposed through the bottom sheet of the second panel and manually operable between an open condition and a closed condition to allow air to be selectively removed from and drawn into the air chamber of the second panel; and
    a second resilient, open-celled, foam panel disposed in the air chamber of the second panel to cause air to be drawn into the air chamber of the second panel upon the expansion of the second foam panel from a collapsed condition, wherein the first panel is superimposed over and connected to the second panel such that the first panel is slidably moveable relative to the second panel.

2. The protective cover of claim 1 wherein the first panel is connected to the second panel with a plurality of spaced apart straps.

3. The protective cover of claim 1 further comprising a force-absorbent material positioned between the first panel and the second panel.

4. The protective cover of claim 3 wherein the force-absorbent material is a plurality of hollow bamboo stems.

5. The protective cover of claim 4 wherein the first panel has a thickness of approximately 1 inch and the second panel has a thickness of approximately 1 inch when inflated.

6. The protective cover of claim 1 wherein the first panel has a thickness of approximately 1 inch and the second panel has a thickness of approximately 3 inches when inflated.

7. A protective cover, comprising:

a first panel having a top sheet and a bottom sheet, the top sheet connected to the bottom sheet to form an air chamber; and a second panel having a top sheet and a bottom sheet, the top sheet of the second panel connected to the bottom sheet to form an air chamber, wherein the first panel is superimposed on and connected to the second panel such that the first panel is slidably moveable relative to the second panel so that the first panel is capable of shearing relative to the second panel upon the first panel being impacted by an object having a force component which is non-perpendicular to the first panel.

8. The protective cover of claim 7 wherein the first panel is connected to the second panel with a plurality of spaced apart straps.

9. The protective cover of claim 7 further comprising a force-absorbent material positioned between the first panel and the second panel.

10. The protective cover of claim 9 wherein the force-absorbent material is a plurality of hollow bamboo stems.

11. The protective cover of claim 9 wherein the first panel has a thickness of approximately 1 inch and the second panel has a thickness of approximately 1 inch when inflated.

12. The protective cover of claim 7 wherein the first panel has a thickness of approximately 1 inch and the second panel has a thickness of approximately 3 inches when inflated.

13. A protective cover in combination with a vehicle, the protective cover comprising:

a first panel having a top sheet and a bottom sheet, the top sheet connected to the bottom sheet to form an air chamber; and a second panel having a top sheet and a bottom sheet, the top sheet of the second panel connected to the bottom sheet to form an air chamber, wherein the first panel and the second panel are disposed over at least a portion of the vehicle and wherein the first panel is superimposed on and connected to the second panel such that the first panel is slidably moveable relative to the second panel so that the first panel is capable of shearing relative to the second panel upon the first panel being impacted by an object having a force component which is non-perpendicular to the first panel.

14. The combination of claim 13 wherein the first panel is connected to the second panel with a plurality of spaced apart straps.

15. The combination of claim 13 wherein the protective cover further comprises a force-absorbent material positioned between the first panel and the second panel.

16. The combination of claim 15 wherein the force-absorbent material is a plurality of hollow bamboo stems.

* * * * *

UNITED STATES PATENT AND TRADEMARK OFFICE
CERTIFICATE OF CORRECTION

PATENT NO. : 7,243,975 B2
APPLICATION NO. : 11/189644
DATED : July 17, 2007
INVENTOR(S) : John A. Harcourt and Susan G. Cody It is certified that error appears in the above-identified patent and that said Letters Patent is hereby corrected as shown below:

On the Title Page, insert the following Publication under "References Cited":
-- AMERI-BRAND PRODUCTS, INC.; Web page; 6/1/2004; Ameri-Brand Products, Inc., 4619 Olive Hwy, Oroville, California, 95966; Website address: www.websweeper.com/php/contact/hail-1.htm; 6/1/2004. --

Signed and Sealed this

Eighteenth Day of March, 2008

JON W. DUDAS
*Director of the United States Patent and Trademark Office*